United States Patent
Priem et al.

[11] Patent Number: 6,141,741
[45] Date of Patent: *Oct. 31, 2000

[54] COMPUTER SYSTEM WITH A SHARED ADDRESS BUS AND PIPELINED WRITE OPERATIONS

[75] Inventors: Curtis Priem, Fremont; Satyanarayana Nishtala, Cupertino; Michael G. Lavelle, Saratoga, all of Calif.; Thomas Webber, Cambridge, Mass.; Daniel E. Lenoski, San Jose, Calif.; Peter A. Mehring, Sunnyvale, Calif.; Guy Moffat, Mountain View, Calif.; Christopher R. Owen, Los Gatos, Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,057

[22] Filed: Aug. 29, 1996

(Under 37 CFR 1.47)

Related U.S. Application Data

[63] Continuation of application No. 08/269,585, Jul. 1, 1994, abandoned.

[51] Int. Cl.[7] .................................................. G06F 12/00
[52] U.S. Cl. .......................... 711/217; 711/218; 711/212; 711/214; 711/211
[58] Field of Search ................................. 395/449, 284, 395/800, 306, 309, 402; 364/716; 711/122, 2, 217, 218

[56] References Cited

U.S. PATENT DOCUMENTS

| | | | |
|---|---|---|---|
| 4,195,352 | 3/1980 | Tu et al. ................................. | 364/716 |
| 4,403,283 | 9/1983 | Myntti et al. ............................ | 395/402 |
| 4,454,575 | 6/1984 | Bushaw et al. .......................... | 395/800 |
| 4,674,032 | 6/1987 | Michaelson ............................. | 364/200 |
| 4,933,845 | 6/1990 | Hayes ..................................... | 395/284 |
| 5,150,467 | 9/1992 | Hayes et al. ............................ | 395/287 |
| 5,191,656 | 3/1993 | Forde, III et al. ....................... | 395/287 |
| 5,228,134 | 7/1993 | MacWilliams et al. ................. | 395/465 |
| 5,237,567 | 8/1993 | Nay et al. ............................... | 370/85.1 |
| 5,253,353 | 10/1993 | Mogul .................................... | 395/449 |
| 5,293,571 | 3/1994 | Matsuda et al. ........................ | 370/85.3 |
| 5,386,579 | 1/1995 | Bourekas et al. ....................... | 395/800 |
| 5,423,008 | 6/1995 | Young et al. ........................... | 395/287 |
| 5,438,666 | 8/1995 | Craft et al. .............................. | 395/842 |
| 5,446,910 | 8/1995 | Kennedy et al. ....................... | 395/800 |
| 5,448,701 | 9/1995 | Metz, Jr. et al. ....................... | 395/293 |
| 5,450,552 | 9/1995 | Michino .................................. | 395/281 |
| 5,483,642 | 1/1996 | Okazawa et al. ....................... | 395/306 |
| 5,490,253 | 2/1996 | Laha et al. .............................. | 395/304 |
| 5,611,058 | 3/1997 | Moore et al. ........................... | 395/309 |

FOREIGN PATENT DOCUMENTS

| | | | |
|---|---|---|---|
| 0020908A1 | 1/1981 | European Pat. Off. ........ | G06F 13/00 |
| 0288649A1 | 11/1988 | European Pat. Off. ........ | G06F 13/34 |

Primary Examiner—John W. Cabeca
Assistant Examiner—Fred F. Tzeng
Attorney, Agent, or Firm—Flehr Hohbach Test Albritton & Herbert LLP; William S. Galliani

[57] ABSTRACT

A computer system with a multiplexed address bus that is shared by both system memory and by slave devices is described. The slave devices are incorporated into an existing system memory configuration by providing a bus controller to execute a two-cycle address sequence on the multiplexed address bus. The address sequence is followed by a transfer of data. A random latency can exist between the time of receiving address information and the time of receiving data corresponding to the address information. This random latency can be exploited by the system CPU for other computational purposes. The bus controller of the system executes multiple, or pipelined, data writes to the bus before an acknowledgement for the first data write is received. In this scheme, the acknowledgement for the first data write is typically sent during the same time period that the subsequent data writes are being received. Consequently, data transfer acknowledgements overlap data writes. This overlapping operation allows the bus to be completely utilized during write operations, thereby improving data bandwidth.

5 Claims, 4 Drawing Sheets

COMPUTER SYSTEM WITH A SHARED ADDRESS BUS AND PIPELINED WRITE OPERATIONS

This is a continuation, division, of application Ser. No. 08/269,585 filed Jul. 1, 1994 now abandoned.

BRIEF DESCRIPTION OF THE INVENTION

This invention relates generally to the transfer of data in computer systems. More particularly, this invention relates to a bus used between a central processing unit, system memory, and one or more slave devices, which uses multiplexed address cycles, and which executes pipelined write operations to reduce data transfer acknowledgement overhead.

BACKGROUND OF THE INVENTION

A computer system relies upon a high-speed memory bus to transfer data between system memory and a central processing unit (CPU). A separate lower speed input/output (I/O) bus is typically used for I/O operations between a CPU and a slave device, such as a print driver. Prior art computer systems have used lower speed I/O buses for data transfer between system memory and a CPU. This technique considerably increases the time required for reading and writing data to memory. Thus, prior art computer systems have provided a high-speed memory bus for the system memory and a separate low-speed I/O bus for slave devices. It would be highly desirable to eliminate this redundancy in hardware and utilize a single high-speed memory bus for data transfers between system memory and a CPU, and for controlling operations between a CPU and a slave device. Such a system should not require a reconfiguration of system memory. In other words, the slave device should operate in conjunction with the existing system memory access architecture.

Prior art techniques for transferring data between a CPU and a slave device on a low speed I/O bus is a two step process. First, the CPU, also called a master device, generates a write request, a memory mapped I/O address, and data onto the I/O bus. A slave device, such as a print driver, reads the information, and then sends an acknowledgement back to the master device. The time between the write request and the data acknowledgement is the data transfer acknowledgement latency.

The data bandwidth of prior art computer buses is limited by this data transfer acknowledgement latency. The data transfer acknowledgement latency problem is more fully appreciated with reference to FIG. 1. A write request is sent from a master device. An acknowledgement signal signifying the receipt of the data is then sent from a slave device several cycles later. Only after this acknowledgement signal is received can the master device issue another write request, as shown in FIG. 1. On a synchronous bus, this data transfer acknowledgement latency doubles or triples the number of clock cycles required to send a single write request.

To mitigate the bandwidth expense associated with data transfer acknowledgement latencies, burst mode data transfers were developed. In a burst mode data transfer, only one acknowledgement is required for a large block of data. Thus, burst mode data transfer amortizes the data transfer acknowledgement latency over larger blocks of write data.

Unfortunately, the burst mode data transfer technique has associated problems. First, the data transfer acknowledgement latency is just as long as in the traditional data transfer case shown in FIG. 1. Another problem is that the burst mode data transfer requires that the same amount of data always be transferred. Frequently, the amount of data to be sent is less than the required amount for burst mode data transfer. This problem may be alleviated by special techniques for masking the unused portion of the burst mode data. However, this results in added system complexity and expense.

Another problem with burst mode data transfers is that they require a fixed byte order. It is frequently desirable to transfer data without conforming to a fixed byte order, for instance in an overlapping copy operation.

Burst mode data transfer techniques have a restricted address range. That is, only addresses within the burst size can be accessed in the burst mode. It is desirable to access any address in any order. This capability is especially important in graphics applications. For example, when drawing vectors and triangles, where addresses are localized, but they are in random directions.

Thus, it would be highly desirable to provide a computer system data bus that reduces data transfer acknowledgement latency overhead. Such a system should avoid the problems attendant with burst mode data transfers.

SUMMARY OF THE INVENTION

The invention is a computer system with a multiplexed address bus that is shared by both system memory and by slave devices. The slave devices are incorporated into an existing system memory configuration by providing a bus controller to execute a two-cycle address sequence on the multiplexed address bus. Each address sequence includes a first write cycle in which high-order address bits are launched on the bus and latched by a selected slave device. The address sequence also includes a second address cycle in which the remaining low-order address bits and byte mask bits are sent to the selected slave device. In subsequent address sequences, the high-order address bits are only re-sent if their content changes. Consequently, most address sequences from the bus controller to a slave device include only a single address cycle.

The address sequence is followed by a transfer of data. Thus, the system has a slave device which utilizes decoupled address and data. A random latency can exist between the time of receiving address information and the time of receiving data corresponding to the address information. This random latency can be exploited by the system CPU for other computational purposes.

The bus controller of the system executes multiple, or pipelined, data writes to the bus before an acknowledgement for the first data write is received. In this scheme, the acknowledgement by the slave device for the first data write is typically sent during the same time period that subsequent data writes are being executed by the master device. Consequently, data transfer acknowledgements overlap data writes. This overlapping operation allows the bus to be completely utilized during write operations, thereby improving data bandwidth.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The present invention is directed toward a computer system with a multiplexed address bus that is shared by both system memory and by slave devices. The single bus eliminates hardware redundancy. In addition, it allows the slave devices to access the large data fields, 64 bits in this example, used by the system memory. In accordance with the invention, slave devices are incorporated into an existing system memory configuration by providing a two-cycle address sequence. Each address sequence includes a first write cycle in which high-order address bits are launched on the bus and latched by a slave device. The address sequence also includes a second address cycle in which the remaining low-order address bits and byte mask bits are sent to the slave device. In subsequent address sequences, the high-order address bits are only re-sent if their content changes. Consequently, most address sequences to a slave device only require a single address cycle conveying the low-order address bits. This feature improves the data bandwidth to the slave device. This is similar to fast page mode in memory systems, but it believed to be novel when used in relation to a slave device.

The address sequence is followed sometime later by a transfer of data. The system of the present invention can have a random latency between the time of receiving address information and the time of receiving data corresponding to the address information. This random latency can be exploited for other computational purposes. The ability to provide a random latency between address and data write operations is believed to be novel.

The present invention also improves the data bandwidth on data buses of a computer system by allowing for multiple, or pipelined, data writes to the data bus before an acknowledgement for the first data write is received. In this scheme, the acknowledgement for the first data write is typically sent during the same time period that subsequent data writes are being executed. Consequently, data transfer acknowledgements overlap data writes. This overlapping operation allows the data bus to be completely utilized during write operations, thereby improving data bandwidth.

The salient features of the invention have now been described. At this time, attention turns to a more detailed consideration of the invention. First, the architecture of the multiplexed bus of the invention will be described. Thereafter, attention will turn to the pipelined writing operation of the invention.

Figure 1:
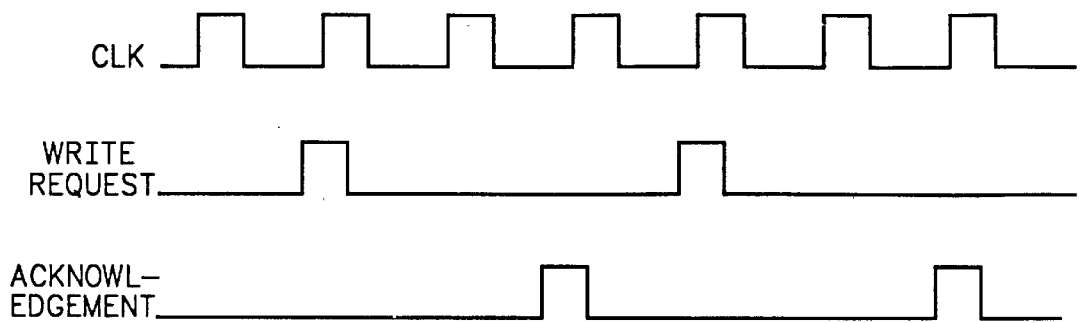
FIG. 1 is a set of timing signals used to illustrate the prior art problem of data transfer acknowledgment latency.
Figure 2:
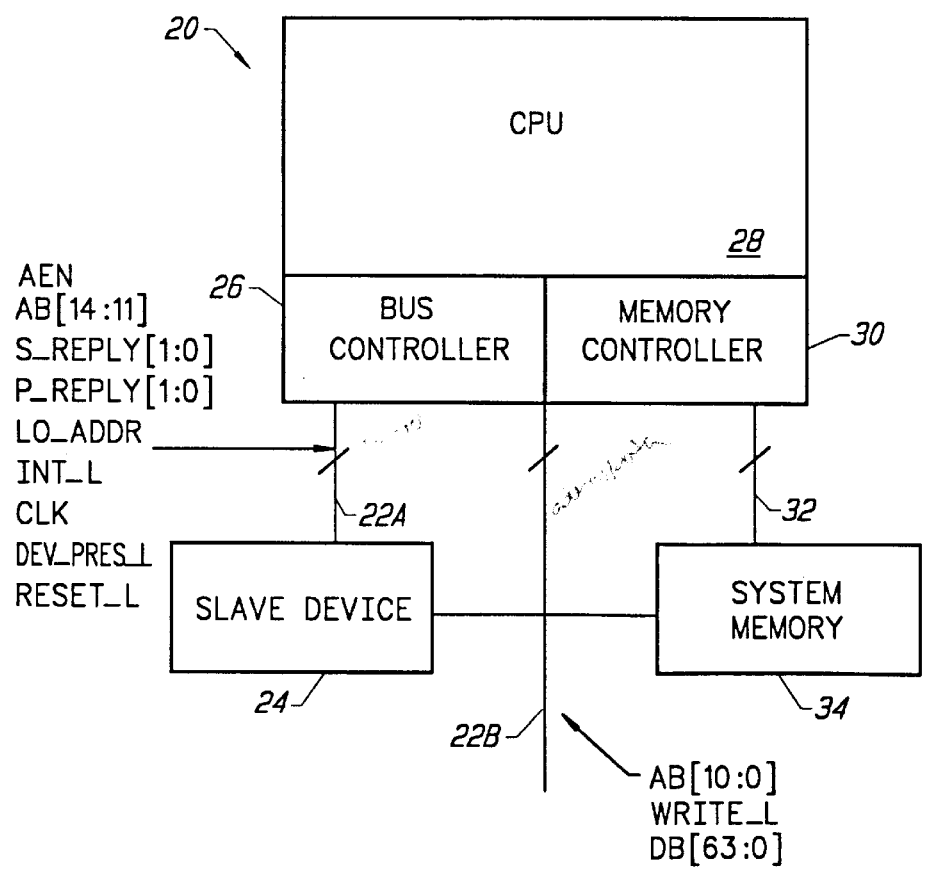
FIG. 2 is a diagram of the computer system in accordance with the invention.

FIG. 2 illustrates a computer system 20 incorporating the multiplexed bus 22 of the invention. The multiplexed bus 22 includes control lines 22A and address/data lines 22B. The multiplexed bus 22 is used to incorporate one or more slave devices 24 into the system 20. The slave devices 24 are controlled by a bus controller 26. For the sake of simplicity, the invention will be described in reference to only one slave device 24. However, it should be appreciated that multiple slave devices may be used.

The control lines 22A, bus controller 26, and slave device 24 are incorporated into an existing system that includes a central processing unit (CPU) 28, a memory controller 30, memory control lines 32, and system memory 34. The address/data lines 22B constitute the existing address/data lines used by system memory 36. Thus, it can be appreciated that the multiplexed bus of the present invention exploits existing system memory 36 resources and adds additional control lines so that a slave device can be used. In this way, the slave device 24 does not require separate address and data buses, thereby reducing system hardware requirements. This feature is also advantageous because the absence of a second bus reduces the number of pins that the CPU must support, an important packaging consideration. Moreover, the slave device can access the large bandwidth data of the address/data lines 22B. Consequently, a high data throughput device, such as a graphics card, may be used as the slave device 24.

The invention is directed toward a multiplexed bus 22 that exploits existing system resources. The existing system resource including the CPU 28, memory controller 30, and system memory 34 are known in the art, and need not be discussed in detail. In addition, the contention operation between the bus controller 26 and the memory controller 30 for the address/data lines 22B may be operated in accordance with any number of contention resolution techniques. It is only important to recognize that the address/data lines 22B are used by the system memory 34 and the slave device 24 at different times.

The address/data lines 22B are in the configuration of an existing computer bus. FIG. 2 indicates that the address/data lines include the following lines: AB[10:0], WRITE_L, and DB[63:0]. The AB[10:0] symbol indicates that there are 11 address lines, the DB[63:0] symbol indicates that there are 64 data lines, and the WRITE_L line is used to distinguish between a read or a write operation.

The multiplexed bus of the invention uses these existing lines and additionally provides for a set of control lines 22A so that the slave device 24 may be serviced. Note in FIG. 2 that the control lines 22A include the following lines: AEN (address enable), AB[14:11], S_REPLY[1:0], P_REPLY [1:0], LO_ADDR (low address), INT_L, CLK, RESET_L, and DEV_PRES_L. The control lines 22A also include test signal lines and power and ground lines, which are omitted for the sake of simplicity.

The operation of each line of the multiplexed bus may be characterized as follows. AEN is an address enable signal. When AEN is asserted (high), it indicates that there is a command request and there is valid data on the AB bus and the LO_ADDR and WRITE_L lines. The AEN signal also qualifies read cycles. The address/byte mask bus, AB[14:0], contains the multiplexed physical address indicating where the data should be written to or read from. In addition, it contains a byte mask. This address/byte mask data is multiplexed over two address cycles, as will be described below.

The system reply signals, S_REPLY[1:0], indicate that the bus has been selected and the type of access. The port reply signals, P_REPLY[1:0], indicate that the data has been processed (removed) from the write buffer on writes or that the read data is available in the read latch.

The low address signal, LO_ADDR, is qualified by the AEN signal. The signal defines which address cycle the controller is sending on the address bus and write lines. When driven to 0, this signal indicates address cycle 0 (high address bits). When driven to 1, this signal indicates address cycle 1 (low address bits and byte mask).

The bus interrupt signal, INT_L, is used by a slave 24 to signal the controller 26 that some event has occurred and requires servicing. Before asserting the interrupt, the slave must set a bit in an internal register to indicate the cause of the interrupt. The interrupt is serviced by the CPU 28 reading this bit. The bit may be cleared by reading it or by an explicit write by the CPU 28. Once cleared, the slave 24 must then unassert the interrupt signal.

The signal, DEV_PRES_L, is used to identify the presence of a device. Specifically, the pin is used to signify that a slave device 24 is present at a physical location.

The bus reset signal, RESET_L, properly initializes all bus slaves after power-up and system reset. Upon detecting the assertion of RESET_L, a bus slave 24 must perform whatever internal operations are required to initialize itself.

The WRITE_L signal is qualified by AEN and is only valid during address cycle 1. When driven to 0, this signal indicates a write request. When driven to 1, this signal indicates a read request.

The data lines, DB[63:0], are used to transfer data between the CPU 28 and the bus slave 24. The data lines support four primary data formats: (1) bytes, which consist of eight data bits, (2) half words, which consist of 16 data bits, (3) words, which consist of 32 data bits, and (4) double words, which consist of 64 data bits. By convention, the least-significant bit of the data bus is DB[0], while the most-significant bit is DB[63].

The operation of each of the described lines of the multiplexed bus 22 is summarized in Table I.

TABLE I

| SIGNAL NAME | I/O | DESCRIPTION | DRIVEN BY |
| --- | --- | --- | --- |
| AEN | I | Address Enable | Controller |
| AB | I | Address/Byte Mask | Controller |
| S_REPLY | I | System Reply | Controller |
| P_REPLY | O | Port Reply | Slave |
| LO_ADDR | I | Low Address Select | Controller |
| INT_L | O | Interrupt | Slave |
| CLK | I | Clock | Controller |
| DEV_PRES_L | O | Device Present | Slave |
| RESET_L | I | Reset | Controller |
| WRITE_L | I | Read/Write Select | Controller |
| DB[63:0] | I/O | Data lines | Controller/Slave |

The multiplexed bus 22 of the invention executes a two-cycle address sequence operation that is described in reference to the foregoing signals and the following table.

TABLE II

| ADDRESS BUS | CYCLE 0 | CYCLE 1 |
| --- | --- | --- |
| LO_ADDR | 0 | 1 |
| AB[14] | PA[27] | BM[3] |
| AB[13] | PA[26] | BM[2] |
| AB[12] | PA[25] | BM[1] |
| AB[11] | PA[24] | BM[0] |
| ========== | ========== | ========== |
| AB[10] | PA[23] | PA[13] |
| AB[9] | PA[22] | PA[12] |
| AB[8] | PA[21] | PA[11] |
| AB[7] | PA[20] | PA[10] |
| AB[6] | PA[19] | PA[9] |
| AB[5] | PA[18] | PA[8] |
| AB[4] | PA[17] | PA[7] |
| AB[3] | PA[16] | PA[6] |
| AB[2] | PA[15] | PA[5] |
| AB[1] | PA[14] | PA[4] |

TABLE II-continued

| ADDRESS BUS | CYCLE 0 | CYCLE 1 |
| --- | --- | --- |
| AB[0] | X | PA[3] |
| WRITE_L | X | R/W |

PA = Physical Address
BM[3:0] = Byte Mask Bits
R/W = Read or Write
X = Don't Care A line appears in Table II to demark that the first set of signals are applied to the control lines 22A, and the second set of signals are applied to the address/data lines 22B. During cycle 0, the slave device 24 latches the high-order address bits (PA[27]-PA[14]). These latched values are then combined with the low-order address bits (PA[13]-PA[3]) in each subsequent address cycle. Another address cycle 0 is only needed when the data access crosses the "page boundary" and the high-order address bits need to be modified.

Note in cycle 1 that byte mask values are latched by the slave device 24. These byte mask values are used to identify where the data is in the 64 bit field. As indicated above, the data lines supports four primary data formats: (1) bytes, which consist of eight data bits, (2) half words, which consist of 16 data bits, (3) words, which consist of 32 data bits, and (4) double words, which consist of 64 data bits. Unlike a prior art burst mode data transfer, the present invention allows any sequence of addresses within the low address range. This is helpful in overlapping copy operations where the data may have to be read and written in reverse order. It also helps in vector and triangle graphics applications where access is localized but in random directions.

Figure 3:
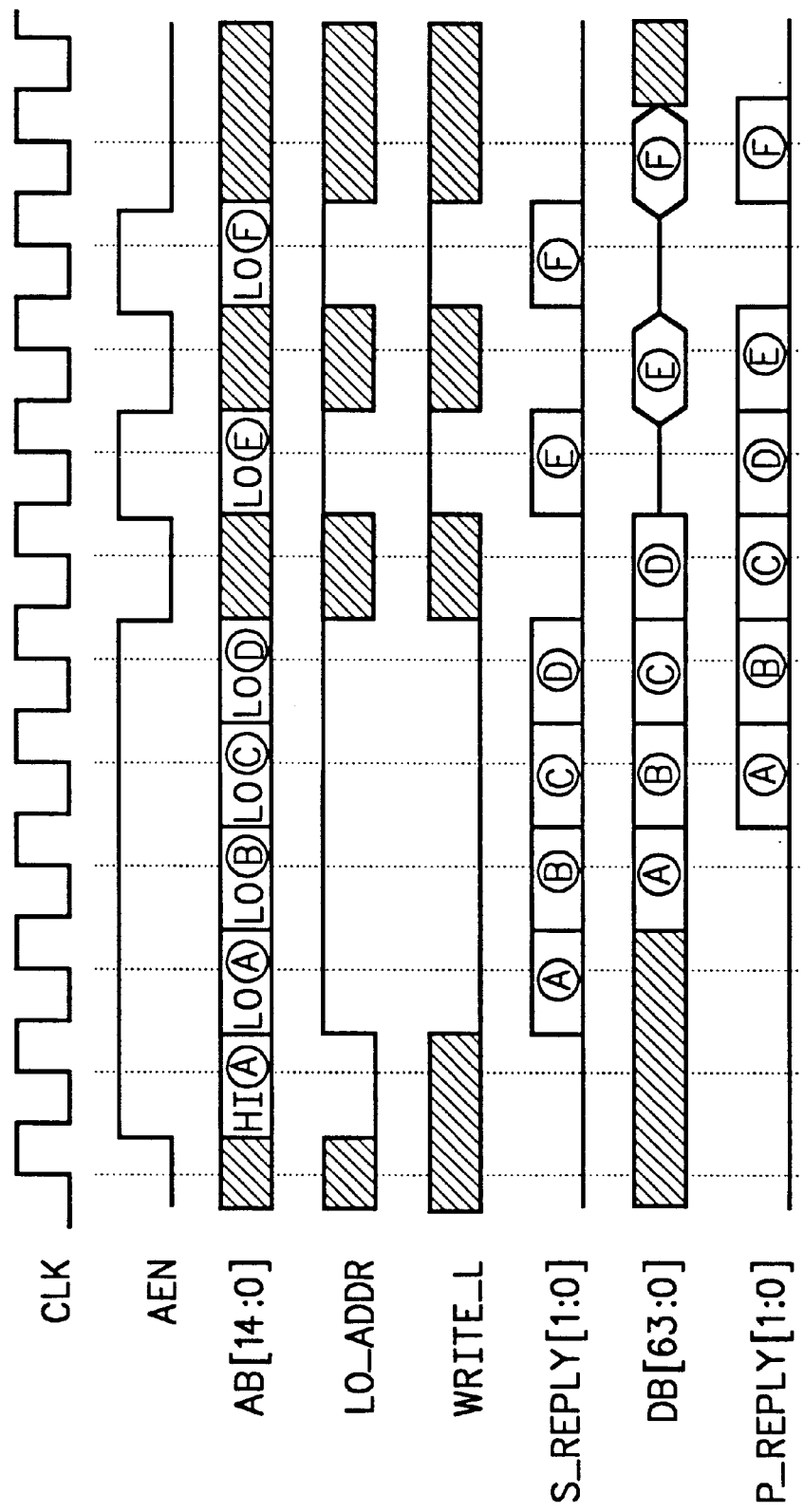
FIG. 3 is a timing diagram illustrating the multiplexed address and the pipelined write operations of the invention.

The two-cycle address sequence operation of the multiplexed bus 22 is more fully appreciated with reference to FIG. 3. FIG. 3 shows that the address enable signal AEN initiates the writing of the high-order bits to AB[14:0] in a first cycle. Thereafter, in response to the low address signal LO_ADDR, the low-order bits are written. Note that since the high-order bits do not change, they are not re-sent and a sequence of low order bits are written.

Figure 4:
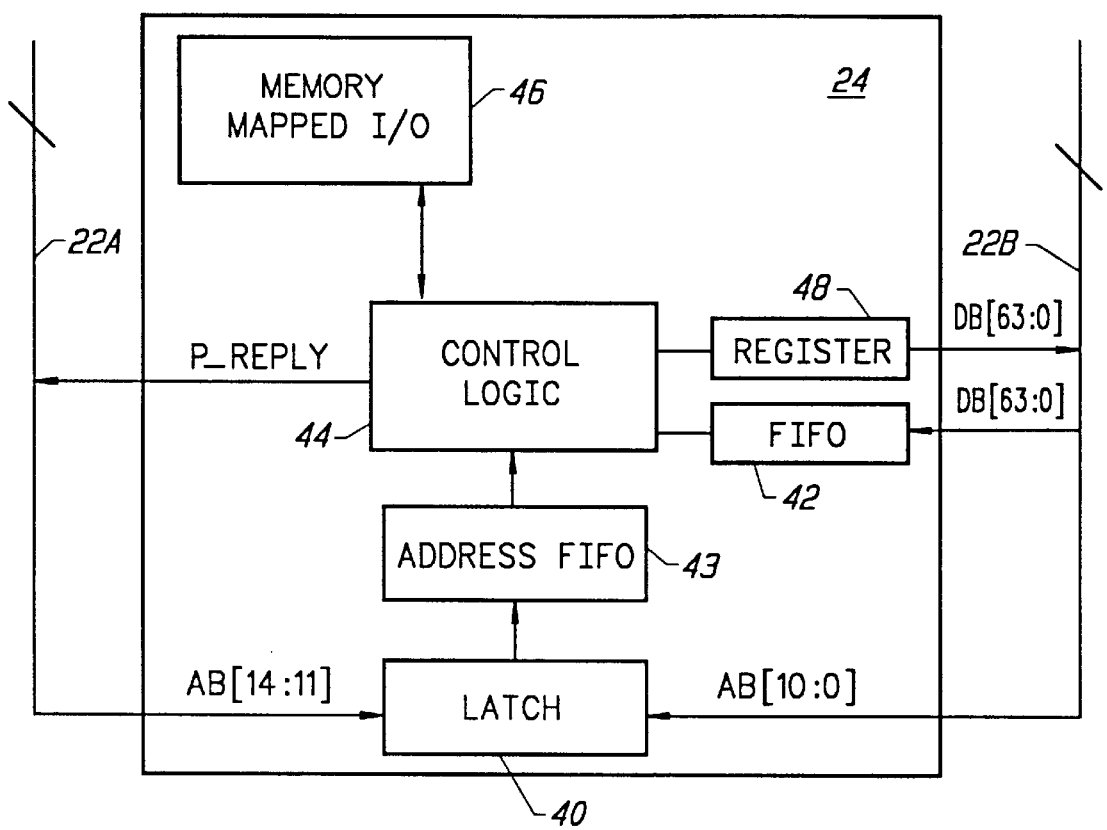
FIG. 4 depicts a slave device that may be used in accordance with the invention.

FIG. 4 shows the processing by the slave 24 in response to the two-cycle address sequence operation of the multiplexed bus 22. In the initial cycle of the write sequence, the high-order address bits are sent. Specifically, the high-order address signals (AB[14:11]) of the high-order address bits are latched into latch 40 over the control lines 22A, and the low-order address bits (AB[10:0]) of the high-order address signals are latched into latch 40 over the address/data lines 22B.

In the next cycle of the address sequence, byte masks are loaded by the control lines 22A into the latch, 40 by lines AB[14:11], and the remaining low-order address bits (AB [10:0]) of the high-order address signals are loaded by the address/data lines 22B into latch 40. All of the address data has now been obtained. When subsequent address writes are initiated, the data in the latch 40 is sent to a standard data storage structure 43, such as a first-in-first-out (FIFO) data storage structure. FIG. 4 shows an address FIFO 43 for storing a sequence of addresses.

After each address is written, the data corresponding to the address is received in a data FIFO 42. The control logic 44 coordinates the received address in latch 40 and the received data in FIFO 42. Recall that the address information includes byte mask data that is used by the control logic 44 to select the proper data. Using memory mapped I/O 46, the control logic 44 executes a selected operation in relation to the received data.

The multiplexed bus 22 of the invention has now been fully described. Attention presently turns to the pipelined write operations of the invention.

As previously indicated, the slave device 24 has an address FIFO 43 and a data FIFO 42 that hold transmitted address and data information. Write requests sent to a slave device 24 are saved in the address FIFO 43 and the data FIFO 42. Subsequently, the control logic reads the data from the respective FIFOs 42, 43 and sends an acknowledge signal to the bus controller 26. Thus, in accordance with the invention, a predetermined number of write requests may be performed and loaded into the address FIFO 43 and the data FIFO 42 of the slave device 24.

This operation is shown in relation to FIG. 3. In FIG. 3 four write requests (A, B, C, D) are launched on the (S_REPLY) lines. As previously indicated, the S_REPLY signal goes directly to the slave device 24 over the control lines 22A. Datapath writes are then initiated on the data lines 22B (DB[63:0]) within one cycle of each write request. The acknowledgements on the P_Reply line, of the control lines 22A, overlap with the write operation. For instance, write request C occurs at the same time as the acknowledgement for write data A.

Thus, it can be appreciated from FIG. 3 that sequential write operations are performed before and during the time that acknowledgements are received. This approach is in contrast to the prior art wherein an acknowledgement is required before each write operation. Thus, in accordance with the invention, a high bandwidth of pipelined write operations is achieved. Note that each write operation has to be acknowledged. In a burst mode data transfer technique a number of writes are sent, but only one acknowledgement is used for the group of writes. The pipelined write operation of the invention does not suffer many of the shortcomings associated with a burst mode data transfer. Specifically, the pipelined write operation does not have to transmit a fixed amount of data, it does not require a fixed byte order, and it does not have a restricted address range. The previously described mask bytes, used in accordance with the invention, provides greater flexibility in data format than is available in a burst mode data transfer operation.

As previously indicated, the invention is implemented by providing each slave device 24 with FIFOs to store the received address and write data. The FIFOs corresponding to the operation in FIG. 3 must be capable of holding four writes. The invention can be implemented with a data storage structure of any number of write operations.

The bus controller 26 operates in a standard manner, but also includes a counter to keep track of the number of write operations. When the counter reaches a predetermined write limit, it activates a control circuit that prevents the bus controller 26 from generating writes beyond the capacity of the FIFOs 42, 43. Thus, in the example of FIG. 3, after four write operations, the bus controller 26 stops executing data writes to the datapath bus 22B.

In FIG. 3, E and F are read cycles. Note that there is a space before read cycle E. It is desirable to design the system 20 so that a read is launched only if there are 1 or zero unacknowledged writes in the FIFOs of the slave 24. Thus, the E write request is launched after the acknowledgement for C is sent on the P_REPLY line. The system 20 may be designed such that a read can be launched despite a large number of unacknowledged writes in the FIFO. However, if the number is too high, then there is a danger that a read operation will stall the system 20 for an unreasonable period of time.

The read operation is performed when the AEN signal is activated, the "Read Single" code (11) is placed on the S_REPLY lines, and the low address write on AB[14:0] of cycle 1 are all performed in the same clock cycle, as shown in FIG. 3. When the slave 24 is ready to acknowledge the read, the slave 24 simultaneously drives the data on the DB lines, through register 48 shown in FIG. 4, and a "Read Single" code (11) on the P_Reply lines. This mode has the advantage of doing a best-case read in two clock cycles.

To fully exploit the architecture of the present invention, the bus controller 26 and the slave device 24 preferably support an additional type of read operation, referred to herein as a split read. The split read allows the CPU 28 to perform functions, say memory writes, while its waiting for the read data.

The split read feature exploits the fact that in the present invention the address signals are decoupled from the data signals. Thus, with the present invention, the address and data may be sent at different times. However, the address must be sent first. Data can then come any number of clock cycles later.

Figure 5:
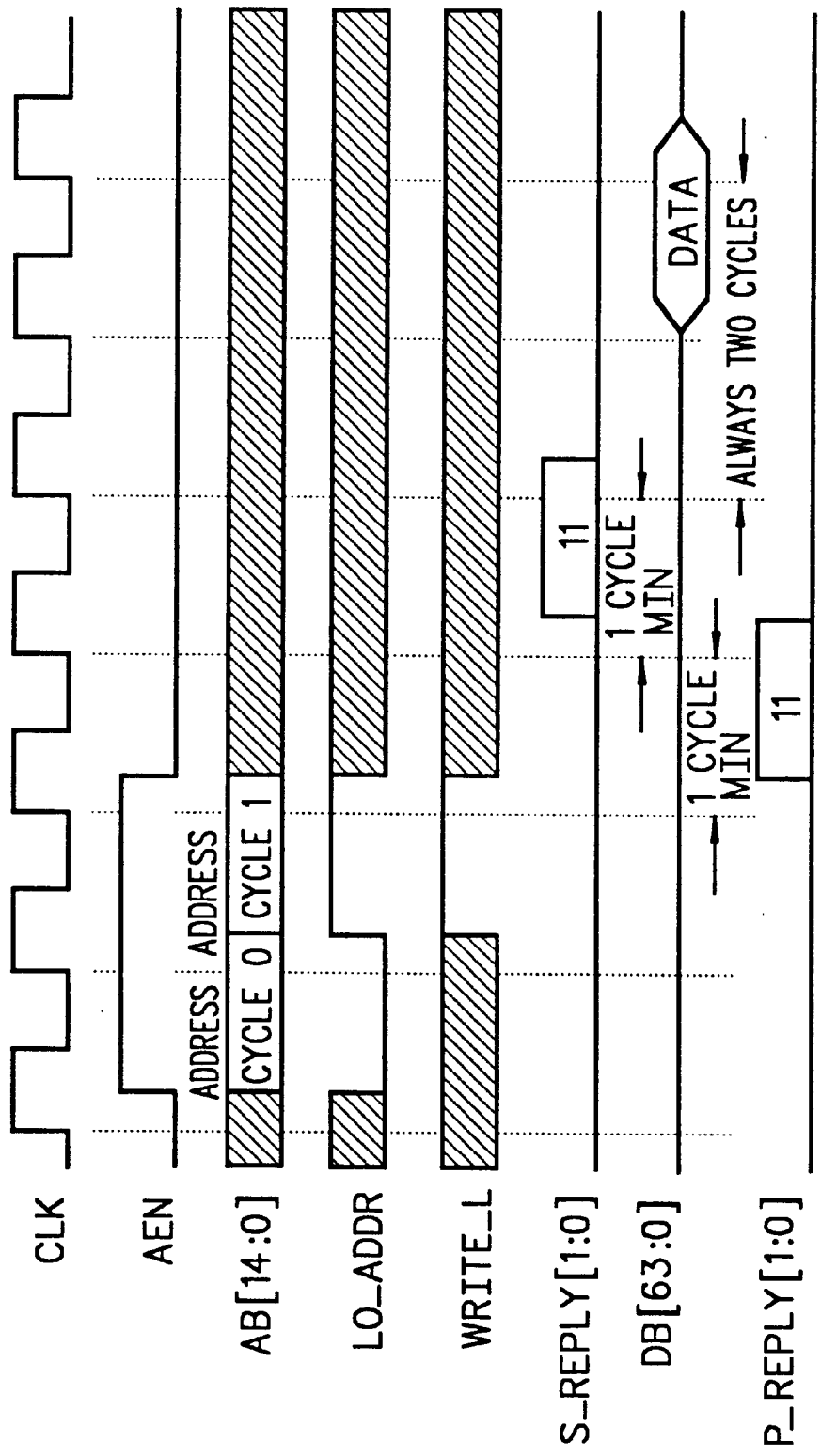
FIG. 5 is a timing diagram illustrating the split read operations of the invention.

This operation is more fully appreciated with reference to FIG. 5. A split read cycle is identified by the slave 24 when the S_REPLY signals are idle during the launching address cycle 1. Once the slave 24 has the data for the access, the slave 24 drives a "Read Single" code (11) on the P_Reply lines. The controller 26 responds with a "Read Single" code (11) on the S_REPLY lines to tell the slave 24 that the data bus is available. The slave 24 drives the data on the DB lines two clock cycles later, and the transfer is complete.

As shown in FIG. 5, the split read takes a minimum of five clock (CLK) cycles. In cycle 0, if required, the bus controller 26 places the address on AB[14:0] and asserts AEN. On the second address cycle (address cycle 1), the bus controller 26 asserts LO_ADDR. When it is ready for the read (identified by WRITE_L being unasserted), the slave 24 asserts the P_REPLY read single (11) code. When it is ready to accept the read data, the bus controller 26 asserts S_REPLY. Two clock cycles later, the slave 24 places the requested read data on DB[63:0].

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, it should be borne in mind that the invention is applicable to multiple slave devices. In addition, the bus controller 26 need not be embedded within a CPU 28. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A computer system, comprising:

a shared address/data bus;

an input/output device address bus;

a memory system directly connected to said shared address/data bus;

an input/output device directly connected to said shared address/data bus and, said input/output device address bus; and a bus controller to generate;

an address transfer sequence including a first cycle with high order address bits that are launched on said shared address/data bus and said input/output device address bus and a second cycle with low order address bits that are launched on said shared address/data bus and mask bits that are launched on said input/output device address bus, said mask bits specifying one of a predetermined set of data field formats, wherein said bus controller generates a sequence of write requests during said address transfer sequence before receiving a write acknowledgment, and a data transfer sequence executed after a latency period following said address transfer sequence, said data transfer sequence including the launch of a plurality of data bits on said shared address/data bus for selective processing by said memory system or said input/output device.

2. The apparatus of claim 1 wherein said predetermined set of data field formats includes: (a) bytes, which consist of a designated number of data bits, (b) half words, which consist of two times said designated number of data bits, (c) words, which consist of two of said half words, and (d) double words, which consist of four of said half words.

3. The apparatus of claim 1 wherein said data transfer sequence is executed after a random latency period following said address transfer sequence.

4. The apparatus of claim 1 wherein said input/output device stores said sequence of write requests and sequentially provides write acknowledgments for each write request of said sequence of write requests.

5. The apparatus of claim 4 wherein said input/output device provides said write acknowledgments after a random latency period.

* * * * *